US011468177B2

(12) United States Patent
Bates et al.

(10) Patent No.: US 11,468,177 B2
(45) Date of Patent: Oct. 11, 2022

(54) APPARATUS AND METHOD FOR ENCRYPTING DATA IN A DATA STORAGE SYSTEM

(71) Applicant: Eidetic Communications Inc., Calgary (CA)

(72) Inventors: Stephen Bates, Canmore (CA); Saeed Fouladi Fard, Calgary (CA)

(73) Assignee: Eidetic Communications Inc., Calgary (CA)

( * ) Notice: Subject to any disclaimer, the term of this patent is extended or adjusted under 35 U.S.C. 154(b) by 307 days.

(21) Appl. No.: 16/713,627

(22) Filed: Dec. 13, 2019

(65) Prior Publication Data

US 2020/0210597 A1 Jul. 2, 2020

Related U.S. Application Data

(60) Provisional application No. 62/785,826, filed on Dec. 28, 2018.

(51) Int. Cl.
*G06F 21/60* (2013.01)
*G06F 21/78* (2013.01)
(Continued)

(52) U.S. Cl.
CPC .......... *G06F 21/602* (2013.01); *G06F 21/64* (2013.01); *G06F 21/78* (2013.01); *H04L 9/0825* (2013.01); *H04L 9/0869* (2013.01); *H04L 9/0894* (2013.01); *H04L 63/0442* (2013.01); *H04L 2209/08* (2013.01)

(58) Field of Classification Search
CPC ........ G06F 21/78; G06F 21/60; G06F 21/602; G06F 21/64; G06F 21/62; G06F 21/6227; H04L 9/08; H04L 9/0894; H04L 9/0825; H04L 9/0869; H04L 63/0428; H04L 63/04; H04L 63/0442
See application file for complete search history.

(56) References Cited

U.S. PATENT DOCUMENTS 8,010,810 B1 * 8/2011 Fitzgerald ............. H04L 9/0822
380/278
9,755,825 B2 9/2017 O'Brien et al.
(Continued)

OTHER PUBLICATIONS

Alendal et al., "Got HW Crypto? On the (in) Security of a Self-Encrypting Drive Series," IACR Cryptology EPrint Archive, Sep. 2015, pp. 1-36.

(Continued)

*Primary Examiner* — Shaqueal D Wade-Wright
(74) *Attorney, Agent, or Firm* — Borden Ladner Gervais LLP; Todd Keeler

(57) ABSTRACT

A system and method that utilize an encryption engine endpoint to encrypt data in a data storage system are disclosed. In the system and method, the client controls the encryption keys utilized to encrypt and decrypt data such that the encryption keys are not stored together with the encrypted data. Therefore, once data is encrypted, neither the host of the data storage system, nor the encryption engine endpoint have access to the encryption keys required to decrypt the data, which increases the security of the encrypted data in the event of, for example, the data storage system being accessed by an unauthorized party.

8 Claims, 9 Drawing Sheets

(51) Int. Cl.
*H04L 9/08* (2006.01)
*G06F 21/64* (2013.01)
*H04L 9/40* (2022.01)

(56) References Cited

U.S. PATENT DOCUMENTS

| | | | |
|---|---|---|---|
| 2008/0222326 A1 | 9/2008 | Liu et al. | |
| 2011/0016317 A1* | 1/2011 | Abe | H04L 9/3231 |
| | | | 713/169 |
| 2019/0229908 A1* | 7/2019 | Peddada | G06F 21/602 |
| 2020/0134202 A1* | 4/2020 | Sapuntzakis | G06F 21/602 |

OTHER PUBLICATIONS

Meijer et al., "Self-Encrypting Deception: Weaknesses in the Encryption of Solid State Drives (SSDs)", Radboud University Research, 2018.

* cited by examiner

APPARATUS AND METHOD FOR ENCRYPTING DATA IN A DATA STORAGE SYSTEM

CROSS REFERENCE TO RELATED APPLICATIONS

This application claims the benefit of U.S. Provisional Application No. 62/785,826 filed on Dec. 28, 2018, which is incorporated herein by reference.

FIELD

The present disclosure relates to encrypting data in a data storage system.

BACKGROUND

With the increasing use of mobile devices and online data storage, data security has become increasingly important in data storage centers. For example, personal and corporate data storage has increasingly moved from private machines to cloud storage, and adequately protecting sensitive information during transfer over a network and while being stored on the cloud can be challenging. Traditional methods like wrapping sensitive data with firewalls and intrusion prevention systems are not reliable solutions for protecting the user data in a public cloud.

Software-based encryption is the most common approach to data security because software-based encryption provides flexibility to protect contents of different storage media and mobile devices. Software-based encryption solutions are typically straightforward to use and maintain and are available in most operating systems today. The main drawback of software-based encryption is that it is computationally intensive and therefore utilizes significant processing resources. Even with advances in encryption co-processors and dedicated instruction sets, encryption remains one of the slowest operations performed by central processing units (CPUs).

While software-based encryption speed may not be a major obstacle in private applications, encryption speed may become a significant impediment in high volume data applications like cloud data servers, particularly if the data needs to be decrypted/re-encrypted between different storage/transmission domains. Another problem with software-based encryption, especially in multi-user systems, is the security risk posed by the availability of unencrypted keys and plaintext in the memory of the computer or system performing the encryption. For example, in a compromised system, unencrypted security keys may be accessible by unauthorized programs when using software-based encryption. Similarly, a user's data may be accessed as the unencrypted plaintext passes through the system memory after decryption.

In hardware-based encryption, the encryption process is offloaded to dedicated hardware such as a hardware accelerator or a dedicated encryption engine that may, for example, be included within a self-encrypting storage device. Hardware-based encryption can offer some level of transparency to the encryption process. Encryption transparency, an empowering aspect of working at scale in data storage centers, does not add a significant amount of workload to the server machines to support data encryption at volume, and therefore frees up processing resources of the host CPU that may be an issue in software-based encryption.

Hardware-based encryption can be an effective solution in offloading the CPU workload. However, some of the weaknesses of the software-based solutions like the exposure of unencrypted security keys or the plaintext data can also affect conventional hardware-based solutions. Moreover, several other security holes have been discovered in some of the major self encrypting devices including accessibility of device firmware, availability of unencrypted data in device memory, insecure vendor specific commands or JTAG access, and weak disk encryption key setup.

Improvements in encrypting data in data centers are desirable.

BRIEF DESCRIPTION OF THE DRAWINGS

Embodiments of the present disclosure will now be described, by way of example only, with reference to the attached Figures in which.

DETAILED DESCRIPTION

Figure 1:
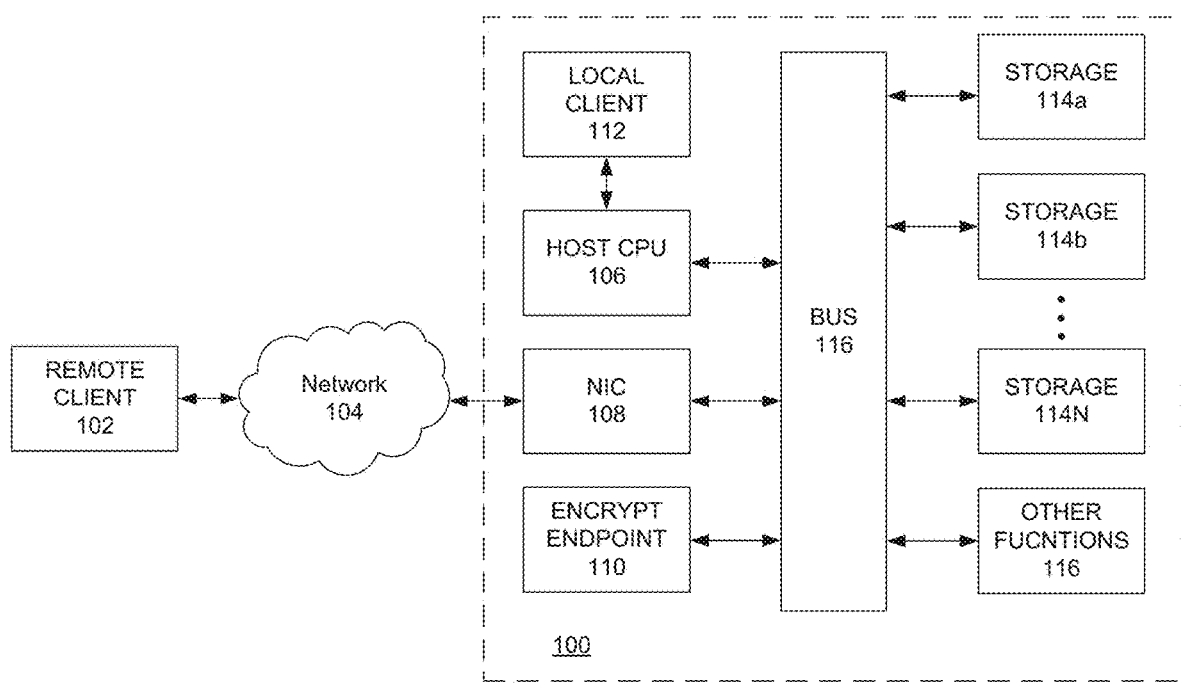
FIG. 1 is a block diagram of an example data storage system including an encryption engine endpoint according to an embodiment of the present disclosure.

Embodiments of the present disclosure relates to a system and method that utilizes an encryption engine endpoint to encrypt data in a data storage system. In the disclosed system and method, the client controls the encryption keys utilized to encrypt data such that the encryption keys are not stored together with the encrypted data. Therefore, once data is encrypted, neither the host of the data storage system, nor the encryption engine endpoint have access to the encryption keys required to decrypt the data, which increases the security of the encrypted data in the event of, for example, the data storage system being accessed by an unauthorized third party.

In an embodiment, the present disclosure provides a method for encrypting data in a data storage system that includes a host CPU, an encryption engine endpoint, and a storage medium that includes receiving, at the encryption engine endpoint from a client, a secure message that includes a storage encryption key, wherein data included in the secure message is previously unknown to the encryption endpoint engine and the host CPU and wherein the secure message is encrypted utilizing a public key of the encryption engine endpoint prior to being received, decrypting, by the encryption engine endpoint, the secure message utilizing a private key of the encryption engine endpoint to obtain the storage encryption key, wherein the decrypted storage encryption key is stored only in a non-persistent memory of the encryption engine endpoint, transmitting, by the encryption engine endpoint to the client, a secure response that is based on the secure message, receiving, at the encryption engine endpoint from the client, storage data to be encrypted using the storage encryption key encrypting, by the encryption engine, the received storage data utilizing the storage encryption key to generate encrypted storage data, and storing the encrypted storage data in the storage medium.

In an example embodiment, the secure message further includes random data not previously known to the encryption endpoint engine and the host CPU such that decrypting the secure message utilizing the private key obtains the random data, and the secure response transmitted to the client is based on the random data.

In an example embodiment, the secure message further includes a communication encryption key, distinct from the storage encryption key, and wherein transmitting the secure response comprises encrypting the secure response with the communication encryption key prior to transmitting to the client.

In an example embodiment, the secure response is a checksum of the storage encryption key.

In an example embodiment, the received storage data is encrypted utilizing the communication encryption key, the method further comprising decrypting, by the encryption engine endpoint, the received storage data prior to encrypting the storage data utilizing the storage encryption key.

In an example embodiment, the secure message further includes random data not previously known to the encryption endpoint engine and the host CPU such that decrypting the secure message utilizing the private key obtains the random data, and wherein transmitting the secure message comprises encrypting the random data utilizing the communication encryption key to generate encrypted random data and transmitting the encrypted random data to the client.

In an example embodiment, communication between the encryption engine endpoint and the client is direct communication utilizing peer to peer communication.

In an example embodiment, unencrypted versions of the storage encryption key and the storage data are stored only in an on-chip non-persistent memory of the encryption endpoint engine.

In another embodiment, the present disclosure provides a method for encrypting data stored in a storage medium of a data storage system that includes the storage medium and an encryption engine endpoint that includes generating a symmetric disk encryption key (DEK) and an authentication marker, the authentication marker comprising storage location data, random data, and a checksum corresponding to random data, and the DEK, the authentication marker, and an administrator password together comprising a security key, encrypting the security key and the authentication marker utilizing a public key of the encryption engine endpoint to generate an encrypted security key and an encrypted authentication marker, storing the encrypted security key in a persistent memory other than the storage medium, storing, by the encryption engine endpoint, the encrypted authentication marker at a location in the storage medium determined by the storage location data, and encrypting, by the encryption engine endpoint, at least a portion of the data stored in the storage medium utilizing the DEK and storing the data in the storage medium as encrypted data.

In an example embodiment, generating the DEK and authentication marker, and encrypting the security key are performed by a client.

In an example embodiment, encrypting the security key to generate the encrypted security key is performed at the client, and the method further comprises receiving at the encryption engine endpoint from the client the encrypted security key.

In an example embodiment, encrypting the authentication marker to generate the encrypted authentication marker comprises the encryption engine endpoint decrypting the received security key utilizing the private key of the encryption engine endpoint to obtain the authentication marker, and encrypting the authentication marker utilizing the public key of the encryption engine endpoint.

In an example embodiment, communication between the encryption engine endpoint and the client is direct communication utilizing peer to peer communication.

In an example embodiment, unencrypted versions of the DEK, the administrator password, and the authentication marker are stored only in an on-chip non-persistent memory of the encryption engine endpoint.

In an example embodiment, the method includes receiving, at the encryption engine endpoint from a client, a data access request to access data stored on the storage medium, the data access request including a password and an encrypted security key encrypted using the public key of the encryption engine endpoint, decrypting, by the encryption engine endpoint, the received encrypted security key utilizing the private key of the encryption engine endpoint to obtain a received security key, the received security key comprising a received administrator password, a received DEK, and a received authentication marker, comparing the received administrator password with the received password, and authenticating the request in response to determining a match between the received administrator password and the received password.

In an example embodiment, the method includes in response to authenticating the client obtaining the encrypted authentication marker stored in the storage medium utilizing storage location data of the received authentication marker obtained from the received security key, decrypting the encrypted authentication maker to obtain the authentication marker stored in the storage medium, comparing the authentication marker stored in the storage medium with the received authentication marker obtained from the received security key, and authenticating the storage medium in response to determining a match between the authentication marker stored in the storage medium and the received authentication marker.

In an example embodiment, the method includes in response to authenticating the storage medium, decrypting the encrypted data stored on the storage medium utilizing the received DEK to generate decrypted data.

In an example embodiment, the request includes a communication encryption key, the method further comprising encrypting the decrypted data utilizing the communication encryption key to generate communication encrypted data.

In an example embodiment, the request includes a destination, the method further comprising transmitted, by the encryption engine endpoint, the communication encrypted data to the destination.

In an example embodiment, the method includes receiving, at the encryption engine endpoint from a client, a password change request that includes the encrypted security key encrypted using the public key of the encryption engine endpoint, an old password, and a new password, decrypting, by the encryption engine endpoint, the received encrypted security key utilizing the private key of the encryption engine endpoint to obtain a received security key, the received security key comprising a received administrator password, a received DEK, and a received authentication marker, comparing, by the encryption engine endpoint, the received administrator password with the old password, in response to determining a match between the received administrator password and the old password, generating, by the encryption engine endpoint, a new security key comprising the received DEK, the received authentication marker, and the new password, the new security key encrypted utilizing the public key of the encryption engine endpoint, transmitting the new security key to the client for storage in a memory other than the storage medium.

In an example embodiment, the method further receiving, at the encryption engine endpoint from a client, an authentication marker change request that includes the encrypted security key encrypted using the public key of the encryption engine endpoint, a password, and a new authentication marker, decrypting, by the encryption engine endpoint, the received encrypted security key utilizing the private key of the encryption engine endpoint to obtain a received security key, the received security key comprising a received administrator password, a received DEK, and a received authentication marker, comparing, by the encryption engine endpoint, the received administrator password with the password, in response to determining a match between the received administrator password and the password encrypting the new authentication marker utilizing the public key of the encryption engine endpoint to generate an encrypted new authentication marker, storing the encrypted new authentication marker in the storage medium at a location determined by storage location data of the new authentication marker, generating, by the encryption engine endpoint, a new security key comprising the received DEK, the received password, and the authentication marker, the new security key encrypted utilizing the public key of the encryption engine endpoint, and transmitting the new security key to the client for storage in a memory other than the storage medium.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 shows a block diagram of an example data storage system 100. The data storage system 100 includes a host central processing unit (CPU) 106, a network interface card (NIC) 108 to facilitate the data storage system 100 being accessed by one or more remote clients 102 over a network 104, an encryption engine endpoint 110 that is utilized to encrypt/decrypt data, a local client 112, storage devices 114a to 114N for storing data on, and other functional components 116 which may include, for example, hardware accelerators that perform other data functions such as compression. The host CPU 106, NIC 108, encryption engine endpoint 110, storage devices 114a to 114N and other functional components 116 are connected together and communicate via a BUS 116. A local client 112 may be connected to the host CPU 106 as shown in FIG. 1. The local client facilitates, for example, an administrator accessing the data storage system 100. Alternatively, or additionally, the local client 112 may be connected to the BUS 116.

The BUS 116 may be a Peripheral Component Interconnect Express (PCIe) bus that that the components of the data storage system 100 may utilize to communicate using, for example, the Non-volatile Memory Express (NVMe) specification.

The network 104 may by any suitable network that facilitates transmitting data between the remote client 102 and the components of the data storage system, and may include a wide area network (WAN), a local area network (LAN), or a combination of WAN and LAN. The network 104 may be provided as an optical network, a wired network, a wireless network, or a combination of any of all of optical, wired and wireless networks.

In an example, the data storage system 100 may be configured such that one or more remote client 102 may communicate with components of the data storage system 100, such as for example any or all of the encryption engine endpoint 110, the local client 112, the other functional components 116 directly using peer to peer (P2P) communication. By using P2P communication, communication traffic does not flow through the host CPU 106, which may facilitate freeing up processing resources of the host CPU 106. Further, in the case of communications between a remote client 102 and the encryption engine endpoint 110 that is related to data encryption, P2P communication may increase security because, even if the security of the host CPU 106 has been compromised due to unauthorized access, the communications bypass the host CPU 106 and are therefore interception of the communication by the unauthorized third party is inhibited.

The storage devices 114a to 114N may include any number of suitable storage devices, and each of the storage devices 114a to 114N any include any suitable type of storage media. The storage devices 114a to 114N may be removable storage devices, or may be non-removable storage devices, or a combination of removable and non-removable storage devices. In an example, the storage devices 114a to 114N may include solid state drives (SSDs) or hard drives, or both SSDs and hard drives.

The example data storage system 100 shown in FIG. 1 may be utilized as a commercial data center. However, in other examples, the data storage system may include less components shown in FIG. 1. For example, the data storage system may include only a client device, such as a local or remote host or client computer, the encryption engine endpoint 110, and one or more storage devices.

Figure 2:
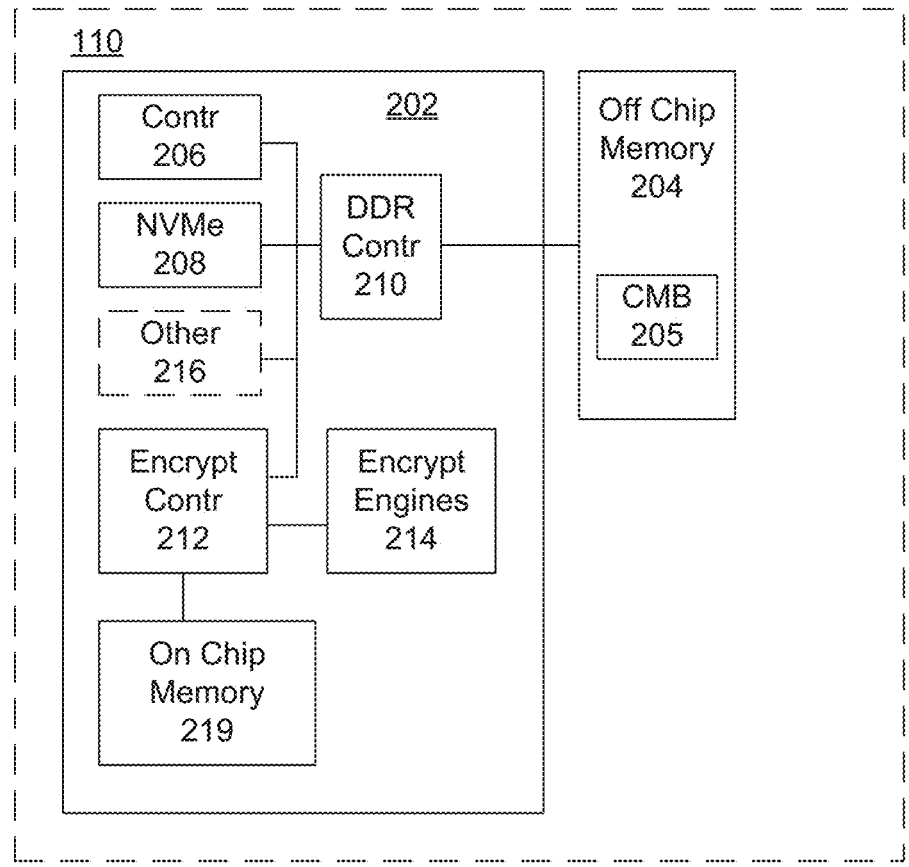
FIG. 2 is a block diagram of an example encryption engine endpoint according to an embodiment of the present disclosure.

Referring now to FIG. 2, a block diagram of an example encryption engine endpoint 110 is shown. The example encryption engine endpoint 110 shown in FIG. 2 comprises a field-programmable gate array (FPGA) 202 and off-chip memory 204 on which a controller memory buffer (CMB) 205 may be provided. The off-chip memory 204 may be any suitable type of non-persistent memory such as, for example, double data rate memory (DDR).

The example FPGA 202 shown in FIG. 2 includes a controller 206 that includes a direct memory access (DMA) engine, an NVMe interface 208, a DDR controller 210, an encryption controller 212, encryption engines 214, on-chip non-persistent memory 219, and may optionally include other components 216 such as, accelerators for performing other data functions such as, for example, data compression/decompression and random noise generation that may be utilized for generating random data. The other components 216 may facilitate performing transformations on unencrypted data, such as compression/decompression, with no need for the unencrypted data to be transmitted outside of the encryption engine endpoint 110, where transmissions may be intercepted, and thus further inhibit unauthorized access to unencrypted data.

The encryption controller 212 controls the encryption and decryption performed by the encryption engines 214. The encryption engines 214 may include an asymmetric encryption engine and a symmetric encryption engine. The asymmetric engine is utilized to perform asymmetric encryption/decryptions such as decrypting, utilizing a private key, data that is encrypted using the public key associated with the encryption engine endpoint 110. The asymmetric encryption engine may also be utilized to encrypt data utilizing a public key, such as the public key of the encryption engine endpoint 110 or the public key of another device storing the data or transmitting the data to that other device. The symmetric encryption engine may be utilized for encrypting/decrypting data utilizing symmetric encryption keys such as, for example, encrypting data for storage in a storage device, such as storage devices 114a to 114N, or decrypting data stored in the storage device, utilizing a storage encryption key. The symmetric encryption engine may also be utilized for encrypting/decrypting messages that are sent and received with another device utilizing a communication encryption key.

As described in more detail later, the present disclosure provides for encrypting data in such a way that plain text encryption keys are only present within the encryption engine endpoint 110. For this reason, use of non-persistent memory for the off-chip memory 204 and the on-chip memory 219 increases security because even if an unauthorized person physically removes the encryption engine endpoint 110, recovering any encryption keys will be extremely difficult because any stored encryption keys will be erased when power to the encryption engine endpoint 110 is lost due to, for example, unplugging the device during removal.

In embodiments of the present disclosure, the encryption engine endpoint 110 may be configured such that sensitive information including, for example, security keys, disk encryption keys (DEKs), passwords, plaintext of data is stored only in the on-chip memory 219 to increase the security of this sensitive data compared to storing this data in off-chip memory by inhibiting access to that sensitive data by other endpoints within the data storage system. This is because data stored in off-chip memory 204 may be more accessible to unauthorized parties than data stored in the on-chip memory 219.

For example, the off-chip memory 204, with the CMB 205, provides a CMB in NVMe applications and may be used as a staging buffer for data transfers. Thus, other endpoints on the bus, such as the other components connected to BUS 116 in the example data storage system 100 shown in FIG. 1, may be able to access the off-chip memory 204 relatively freely in order to stage the P2P transfers of data. Further, unlike data transfers to the on-chip memory 219 which takes place entirely within the FPGA, data transferred from the FPGA to the off-chip memory 204 passes through board wires that are external to the FPGA 202 and therefore are more susceptible to being intercepted by, for example, tapping the board wires.

Storing data in off-chip memory is a weaknesses of some conventional self-encrypting storage systems, particularly self-encrypting storage systems that utilize CPUs or controllers to perform encryption. In these conventional systems, unauthorized parties may access the off-chip memory using vendor specific commands in some systems or by tapping the wires that lead to the off-chip memory to steal the plaintext or the unencrypted data or encryption keys.

By contrast, the on-chip memory 219 is contained within the FPGA 202 such that accessing the contents of the on-chip memory 219 from outside of the FPGA 202 is more difficult than the contents of the off-chip memory 204.

Due to the ability to access of the off-chip memory 204 by other endpoints of the data storage system, and the susceptibility of board wires being tapped, data stored in the off-chip memory 204 is less secure than data stored in the on-chip memory 219. For this reason, data stored on the on-chip memory 219 is more secure than data stored on the off-chip memory 204.

Although the example encryption engine endpoint 110 is described as comprising a FPGA 202 that includes controller 206, NVMe interface 208, DDR controller 210, encryption controller 212, encryption engines 214, and optional other components 216, in other embodiments these components of the encryption engine endpoint 110 may be provided by an application-specific integrated circuit (ASIC) or a controller running the equivalent instructions in place of the FPGA 202.

Figure 3:
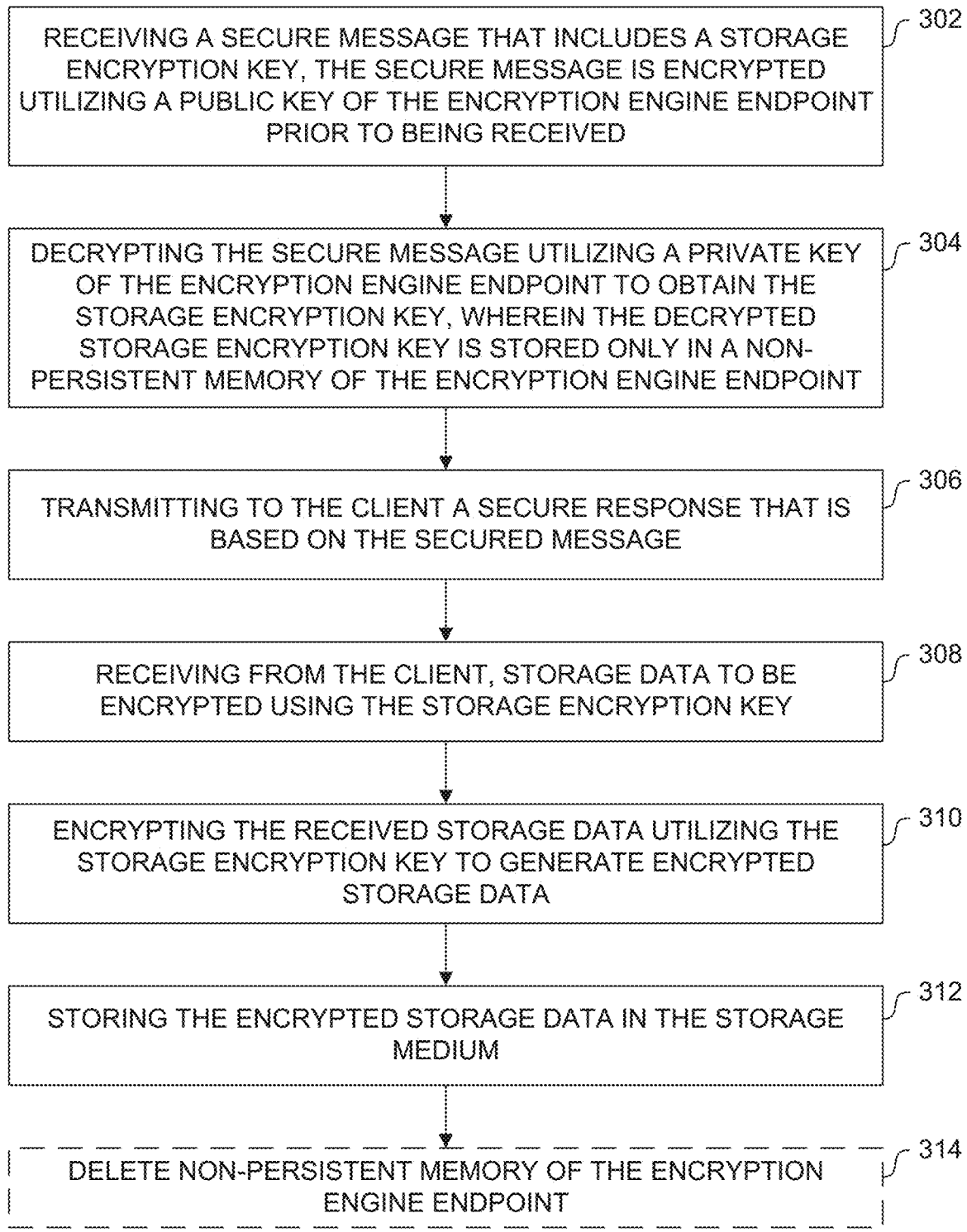
FIG. 3 is a flow chart of an example method for encrypting data in a data storage system in accordance with an embodiment of the present disclosure.

Referring now to FIG. 3, a flow chart showing a method for encrypting data in a data storage system is shown. The method of FIG. 3 may be utilized in a user file encryption (UFE) context in which a client desires to encrypt data for storage in a storage device, such as the storage devices 114a to 114N described above with reference to the example data storage system 100 shown in FIG. 1. The method may be implemented in the example encryption engine endpoint described above. The method may be performed by, for example, one or more processors or controllers of an encryption engine endpoint that performs instructions stored in a memory of the encryption engine endpoint.

At 302, a secure message is received at the encryption engine endpoint from a client. The encryption engine endpoint may be similar to the example encryption endpoint engine 110 described above with reference to FIG. 1. The client may be, for example, a remote client or a local client, such as remote client 102 or the local client 112 of the example data storage system 100 described previously with reference to FIG. 1.

In an example, the secure message may be received at the encryption engine endpoint at 302 after the client has requested to the host CPU to communicate with the encryption engine endpoint. The request to the host CPU may also include authorization of the client in some way such as by, for example, providing login details, such as a username and password, for a user account within the data storage system.

The secure message includes a storage encryption key, which may be, for example, a symmetric key that is randomly generated. The secure message is encrypted utilizing a public key associated with the encryption engine endpoint. Each encryption engine endpoint may have unique public/private keys such that the encryption engine endpoint is the only device that is able to decrypt a secure message that is encrypted with the encryption engine endpoint's public key. In this manner, even if the secure message is intercepted by an unauthorized party, that party would be inhibited from accessing the storage encryption key included in the secure message.

Additionally, the secure message may also include random data, or a communication encryption key, or both the random data and the communication encryption key. The random data may be utilized to generate a secure response, as described in more detail below. The communication key may be a symmetric key that is randomly generated, and may be utilized for encrypting subsequent communication between the encryption endpoint engine and the client.

As described in more detail below, the encryption engine endpoint transmits a secure response back to the client which is based on the secure message such that the client can be confident that the secure response is coming from the expected encryption engine endpoint. For this reason, the secure message includes, at least partially, data that is previously unknown to the encryption engine endpoint and host CPU such as, for example, data that is randomly generated by the client that is then encrypted with the public key of the encryption engine endpoint. This data that is previously unknown to the encryption engine endpoint and the host CPU is utilized to generate the secure response.

At 304, the encryption engine endpoint decrypts the secure message utilizing the private key to obtain the plain text, i.e., decrypted, storage encryption key. The encryption engine endpoint stores the plain text storage encryption key only in the non-persistent memory of the encryption engine endpoint, such as off-chip memory 204 or on-chip memory 219 of the example encryption engine endpoint 110 described with reference to FIG. 2. The plain text storage encryption key, and plain text communication encryption key if included in the secure message, are stored in the on-chip memory, such as memory 219, only to provide additional security for encryption keys as described previously.

At 306, the encryption engine endpoint transmits a secure response to the client. The secure response is based on the secure message, and in particular data included in the secure message that was previously unknown to the encryption engine endpoint prior to receiving the secure message at 302. The secure response is based on the secure message such that the client can verify that the secure response is an expected response, based on the secure message that was sent, and therefore confirm that the secure message was properly received by the encryption engine endpoint.

For example, the secure response may be, for example, a checksum or a hash of the storage encryption key. In this example, the checksum or hash may be encrypted prior to transmitting the secure response to the client in order to inhibit an unauthorized party who intercepts the transmission at 306 from determining the storage encryption key based on the checksum or hash. The secure response in this example, may be encrypted utilizing the communication encryption key, if included in the secure message received at 302, or a public key of the client. The client may then compare the checksum or hash that is received with the storage encryption key that was sent and, if the checksums or hashes match, the client may verify that the secure message was properly received by the intended encryption engine endpoint.

In another example, the secure response may be based on the random data if the random data was included in the secure message received at 302. In an example, transmitting the secure response at 306 may be simply transmitting the plain text random data to the client. In another example, the random data may be encrypted prior to transmitting to the client. The encryption may utilize, for example, a communication encryption key if such a communication encryption key is included in the secure message received at 302, or may utilize a public key associated with the client. The client may then compare the random data of the secure message with the random data that sent by the client, and if the random data sets match, the client may verify that the secure message was properly received by the intended encryption engine endpoint.

In other embodiments, the secure response may be some other value or data that is derived from the random data such that may the client may compare with an expected secure response to verify that the secure message was properly received by the intended encryption engine endpoint. For example, the secure response may be a checksum or a hash that is calculated for the random data received at 302.

When the client has verified that the secure message has been properly received by the intended encryption engine endpoint, the client may then be confident that storage data for encryption utilizing the storage encryption key received at 302 may be securely transmitted to the encryption engine endpoint. Thus, at 308 storage data from the client is received at the encryption engine endpoint. The storage data may be encrypted prior to being received at 308 in order to maintain the security of the storage data during transmission, and inhibiting access to the storage data by an unauthorized third party that may intercept the transmission. The storage data may be encrypted utilizing, for example, the public encryption key of the encryption engine endpoint or utilizing a communication encryption key if the communication encryption key was included in the secure message received at 302. In an example in which the storage data is encrypted prior to being received at 308, the encryption engine endpoint may store the storage data received at 308 in non-persistent memory such as, for example, the off-chip memory 204 or the on-chip memory 219 of the example encryption engine endpoint 110 described above with reference to FIG. 2. However, if the storage data received at 308 is unencrypted, then the encryption engine endpoint may store the received storage data only in the on-chip memory, such as the on-chip memory 219 of the example encryption engine endpoint 110 for increased security as described previously.

At 310, the encryption engine endpoint encrypts the storage data utilizing the storage encryption key received at 302 in order to generate encrypted storage data. In the event that the storage data was encrypted prior to being received at 308, then encrypting the storage data at 310 may include first decrypting the received storage data utilizing the appropriate key, i.e., the private key of the encryption engine endpoint if the storage data was encrypted with the public key of the encryption engine endpoint, or with the communication encryption key if the communication encryption key was included in the secure message at 302.

At 312, the encrypted storage data generated at 310 is stored in a storage medium of the data storage system. For example, the storage medium in which the encrypted storage data is stored in may be included in any one of the storage devices 114a to 114N of the example data storage system described above with reference to FIG. 1.

In other examples, the encrypted storage data may be stored in a storage medium that is external to the data storage system in which the encryption engine endpoint is provided. For example, the encryption engine endpoint may send the encrypted storage data to another storage device via, for example, the NIC 108 and the network 104 shown in the example data storage system described with reference to FIG. 1. In this example, the client may send a destination for the encrypted storage data to the encryption engine endpoint. The destination may be included in the secure message received at 302, or may be included together with the storage data received at 308.

Optionally, at 314, the non-persistent memory of the encryption engine endpoint may be cleared after the encrypted storage data is stored at 312. For example, an on-chip memory, similar to on-chip memory 219 described with reference to FIG. 2, or the off-chip memory, similar to off-chip memory 204 described with reference to FIG. 2, or both on-chip and off-chip memories, may be cleared at 312. As described above, plain text of the storage encryption key, and communication encryption key if included in the secure message, are stored in a non-persistent memory, such as, for example, the on-chip memory 219 of the example encryption engine endpoint 110 described with reference to FIG. 2. Further, during one or more of the steps of receiving the storage data at 308 and encrypting the storage data at 310, the encryption engine endpoint may store the storage data in plain text in a non-persistent memory, such as, for example, the on-chip memory 219 described with reference to FIG. 2. As discussed above, the non-persistent memory is erased when power is lost, such as when the encryption engine endpoint is physically removed from the data storage system, which protects the data in the event that an unauthorized person physically removes the encryption engine endpoint. However, erasing the non-persistent memory at 314 may provide additional security by inhibiting access to the storage encryption key and the storage data in the event that the encryption engine endpoint is accessed by an unauthorized party for example, via the network 104 or by removing the encryption engine endpoint while maintaining power to the encryption engine endpoint.

Accessing the encrypted storage data may be performed utilizing steps similar to steps of the method for encrypting the data as described with reference to FIG. 3. For example, an encryption engine endpoint may receive a request to access the stored data. The request may include the secure message, similar to 302 described previously, such that the encryption engine endpoint receives the storage encryption key encrypted utilizing the encryption engine endpoint's public key. The encryption engine endpoint then decrypts the secure message, similar to 304 described previously. The encryption engine endpoint may then send back a secure response to the client, similar to 306 described previously, such that the client can verify that the request for the storage data was received as intended. The encryption engine endpoint may then retrieve the encrypted storage data from the storage medium, decrypt the storage data utilizing the received storage encryption key, and transmit the storage data to the client or to some other destination specified in the request. If the secure message includes a communication encryption key, then the storage data may be encrypted utilizing the communication encryption key prior to transmitting the storage data.

The method set forth flow chart shown in FIG. 3 enables encryption by a user of discrete data files in a way that the user is in control of the storage encryption key needed to decrypting the data. Having the user control of the encryption keys increases security of the encrypted storage data, while at the same time facilitating offloading encryption from the host CPU in order to reduce processing demands placed on the host. For example, utilizing P2P communication between the client and the encryption engine endpoint, the host CPU is bypassed when the secure message is received at 302, when the secure response is transmitted at 306 and when the storage data is received at 310. Therefore, even if the host CPU is accessed or controlled by an unauthorized party, that party would not see such communications between the client and the encryption engine endpoint. Further, because the secure message is encrypted using the public key of the encryption engine endpoint, only the encryption engine endpoint is able to decrypt the secure message and retrieve the storage encryption key provided that private key is kept secret. Thus, the host CPU, or any unauthorized party that gains access to the host CPU cannot decrypt the encrypted storage data because the host CPU does not ever have access to the storage encryption key. Transmitting a communication encryption key in the secure message may further increase security by keeping subsequent communication between the encryption engine endpoint and the client securely encrypted utilizing an encryption key that only the client and the encryption engine endpoint have access to. Further, because the plain text storage encryption key stored only in the non-persistent memory of the encryption engine endpoint, even the encryption engine endpoint cannot decrypt the encrypted storage data once the non-persistent memory is cleared or power has been lost to the encryption engine endpoint.

Figure 4:
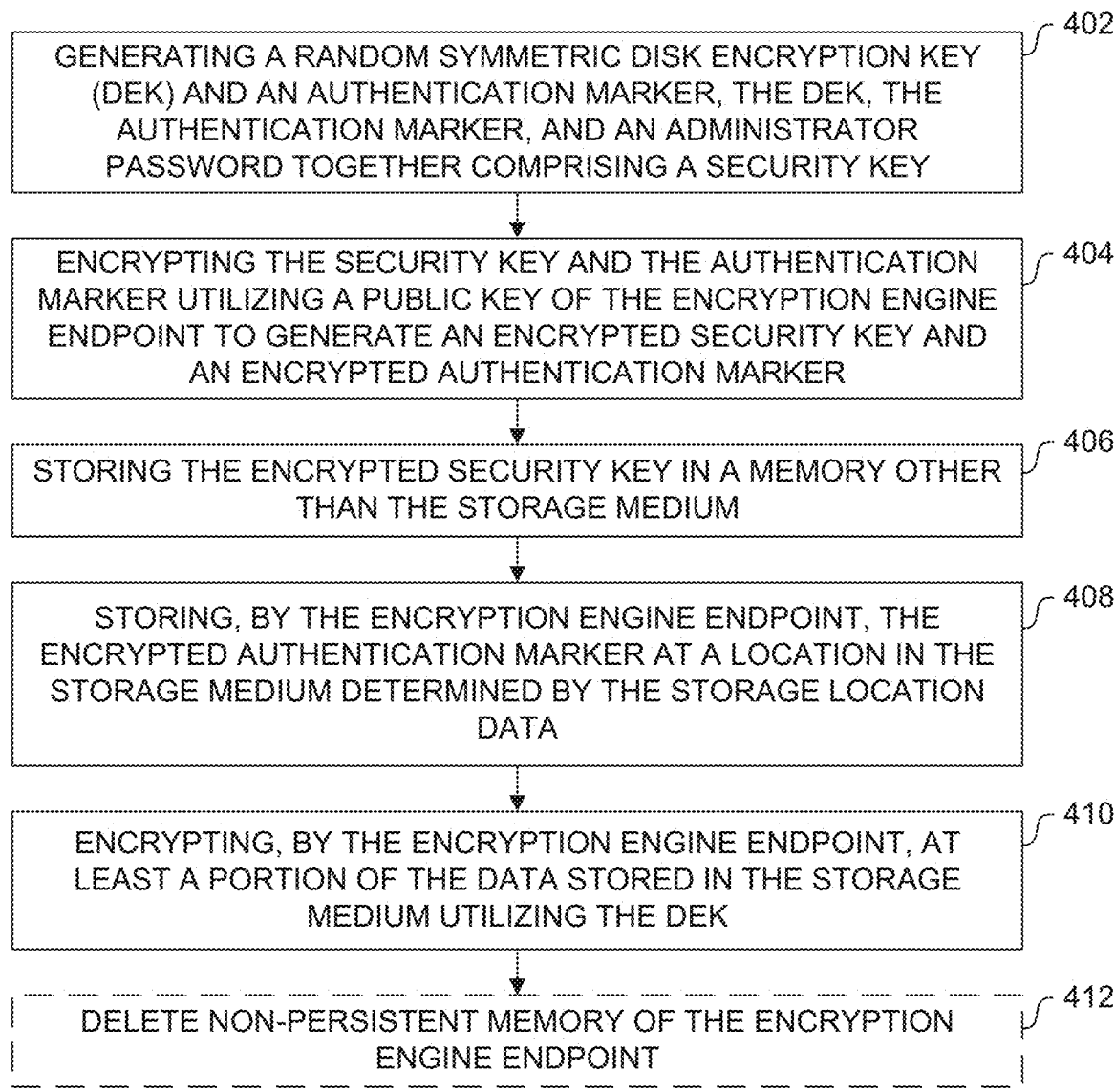
FIG. 4 is a flow chart for another example method for encrypting data in a data storage system in accordance with another embodiment of the present disclosure.

Referring now to FIG. 4, a flow chart of another method for encrypting data in a data storage system. The method set forth in FIG. 4 may be utilized for encrypting at least a portion of a storage medium, such as a storage medium included in one of the storage devices 114*a* to 114N of the example data storage system 100 described with reference to FIG. 1. The encryption of at least a portion of a storage medium by the method set forth in FIG. 4 may be performed in what may be referred to as a full disk encryption (FDE) context. FDE may be initiated by, for example, an administrator of a data storage system. In an embodiment, the method may be implemented in an endpoint encryption engine, such as the example encryption engine endpoint 110 described above. The method may be performed by, for example, one or more processors or controllers of an encryption engine endpoint that performs instructions stored in a memory of the encryption engine endpoint. In another embodiment, a portion of the method may be performed by an encryption engine endpoint, while another portion of the method may be performed by another device such as a client, which may be, for example, the remote client 102, the local client 112, or the host CPU 106 of the example data storage system.

At 402, a symmetric disk encryption key (DEK) and an authentication marker are generated. The authentication marker may include storage location data, random data, and a checksum corresponding to random data. The DEK may be any randomly generated symmetric security key.

The DEK and the authentication marker may be generated at 402 in response to a command to initiate the encryption all or part of a storage medium. In an example, the command to initiate the encryption of all or part of the storage medium may be sent, for example, to the encryption engine endpoint after a client has requested to the host CPU to communicate with the encryption engine endpoint. The request to the host CPU may also include authorization of the client in some way such as by, for example, providing login details, such as a username and password, for a user account within the data storage system. Once the client is authorized by the host CPU, the client and the encryption engine endpoint may communicate directly utilizing P2P communication such that the communication bypasses the host CPU.

The command to initiate encryption of all or part of the storage medium may be provided in relation to a formatting of the storage medium. Initiating encryption of the storage medium includes providing an administrator password that is utilized for accessing the encrypted contents of the storage medium, and is generally chosen by the administrator and must be retained by the administrator in order to later access the encrypted data. "Administrator" here is used to designate any person who initiates the encryption of all or part of the storage medium.

The DEK, the authentication marker, and the administrator password together comprise a security key.

The generation of the DEK and the authentication marker may be performed by either the client that originates the command to perform the FDE method illustrated in FIG. 4.

The client may be, for example, a remote client, a local client, or a host CPU of the data storage system. The DEK and the random data of the authentication marker may be generated utilizing a random noise generator included within the client.

In another embodiment, one or both of the DEK and the authentication marker may be generated at the encryption engine endpoint. For example, the DEK and the random data may be generated by a random noise generator of the encryption engine endpoint such as, for example, a random noise generator included as one of the other components 216 of the example encryption engine endpoint 110 described above with reference to FIG. 2. The encryption engine endpoint may generate one or both of the DEK and the authentication marker in response to, for example, receiving the administrator password for the encryption together with a command from the client to perform FDE of the storage medium.

At 404, the security key and the authentication marker are encrypted utilizing the public key of the encryption engine endpoint to generate an encrypted security key and encrypted authentication marker. In the example above in which the DEK and the authentication marker are generated by the client, the client may perform the encryption of the security key, then send the encrypted security key to the encryption engine endpoint when the client sends the command to perform data encryption on the storage medium. Encrypting the security key prior to transmission inhibits the DEK, the authentication marker, and the administrator password from being accessed by unauthorized parties.

In this example, the client may separately encrypt the authentication marker utilizing the public key of the encryption engine endpoint and send both the encrypted security key and the encrypted authentication marker to the encryption engine endpoint. Alternatively, the client may send only the encrypted security key and the encryption engine endpoint may decrypt the encrypted security key to obtain the authentication marker, which the encryption engine endpoint then encrypts using its public key to generate the encrypted authentication marker. The encryption engine endpoint also obtains the DEK, which is stored only in the non-persistent memory of the encryption engine endpoint in order to increase the security of the DEK, similar to the storage encryption key as described previously. For example, the DEK may be stored only in on-chip memory, such as the on-chip memory 219 of the encryption engine endpoint 110 described with reference to FIG. 2, to further increase the security of the stored DEK as described previously.

In this example, once the client has encrypted the security key, it may erase the plain text DEK and authentication marker from memory such that only encrypted version of the security key is stored.

In this alternative example in which one or both of the DEK and authentication marker are generated at the encryption engine endpoint, the encryption engine endpoint may perform the encryption of the security key and the authentication marker at 404.

At 406, the encrypted security key is stored in a memory other than the storage medium that is to be encrypted. In an example, the encrypted security key is stored in a memory of the client that has initiated the encryption of the storage medium. As described in more detail below with reference to FIG. 5, the stored encrypted security key, together with the administrator password are needed to later access the encrypted contents of the storage medium.

At 408, the encryption engine endpoint stores the encrypted authentication marker at a location in the storage medium that is determined by the storage location data included in the authentication marker. As described in more detail below with reference to FIG. 5, storing the encrypted authentication marker on the storage medium enables the encryption engine endpoint to later verify the authenticity of the storage medium when later accessing the encrypted contents of the storage medium. The storage location data may be randomly generated in order to inhibit prediction of the location in the storage medium at which the authentication marker is stored.

At 410, the encryption engine endpoint encrypts at least a portion of the storage medium the utilizing DEK. The portion of the storage medium that is encrypted may be specified in the command that initiated the encryption of the storage medium. The portion that is encrypted does not necessarily have to include the location at which the encrypted authentication marker is stored.

Optionally at 412, the non-persistent memory of the encryption engine endpoint is cleared. For example, an on-chip memory, similar to on-chip memory 219 described with reference to FIG. 2, or the off-chip memory, similar to off-chip memory 204 described with reference to FIG. 2, or both on-chip and off-chip memories, may be cleared at 412. As described above with respect of 314 in FIG. 3, clearing the non-persistent memory ensures that any plain text versions of the DEK, authentication marker, or administrator password are wiped from the memory of the encryption engine endpoint in order to inhibit access to this data by unauthorized parties that may gain access to the encryption engine endpoint.

Figure 5A:
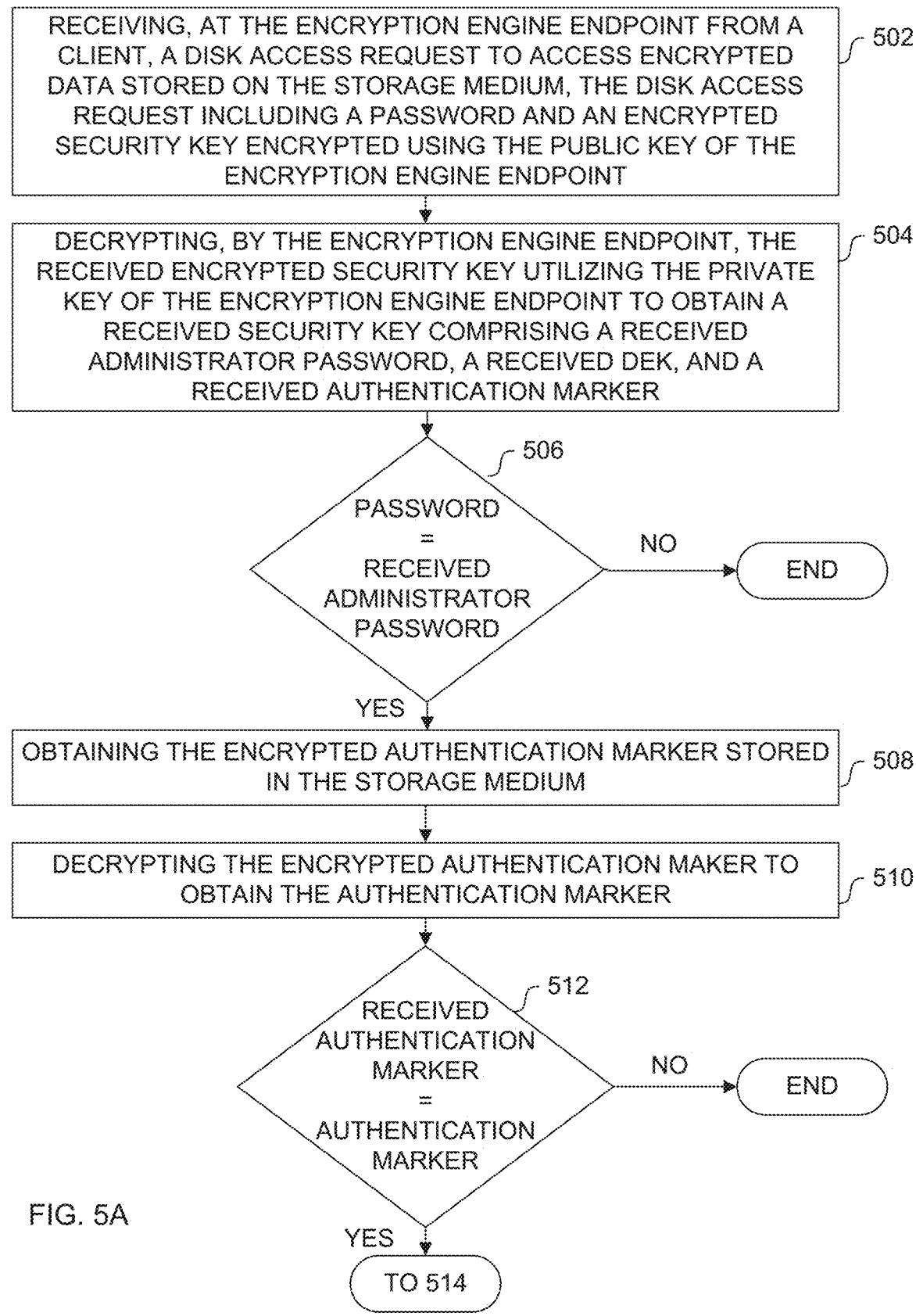
FIGS. 5A and 5B are a flow chart of an example method for accessing a storage device that has been encrypted according to the embodiment of FIG. 4.
Figure 5B:
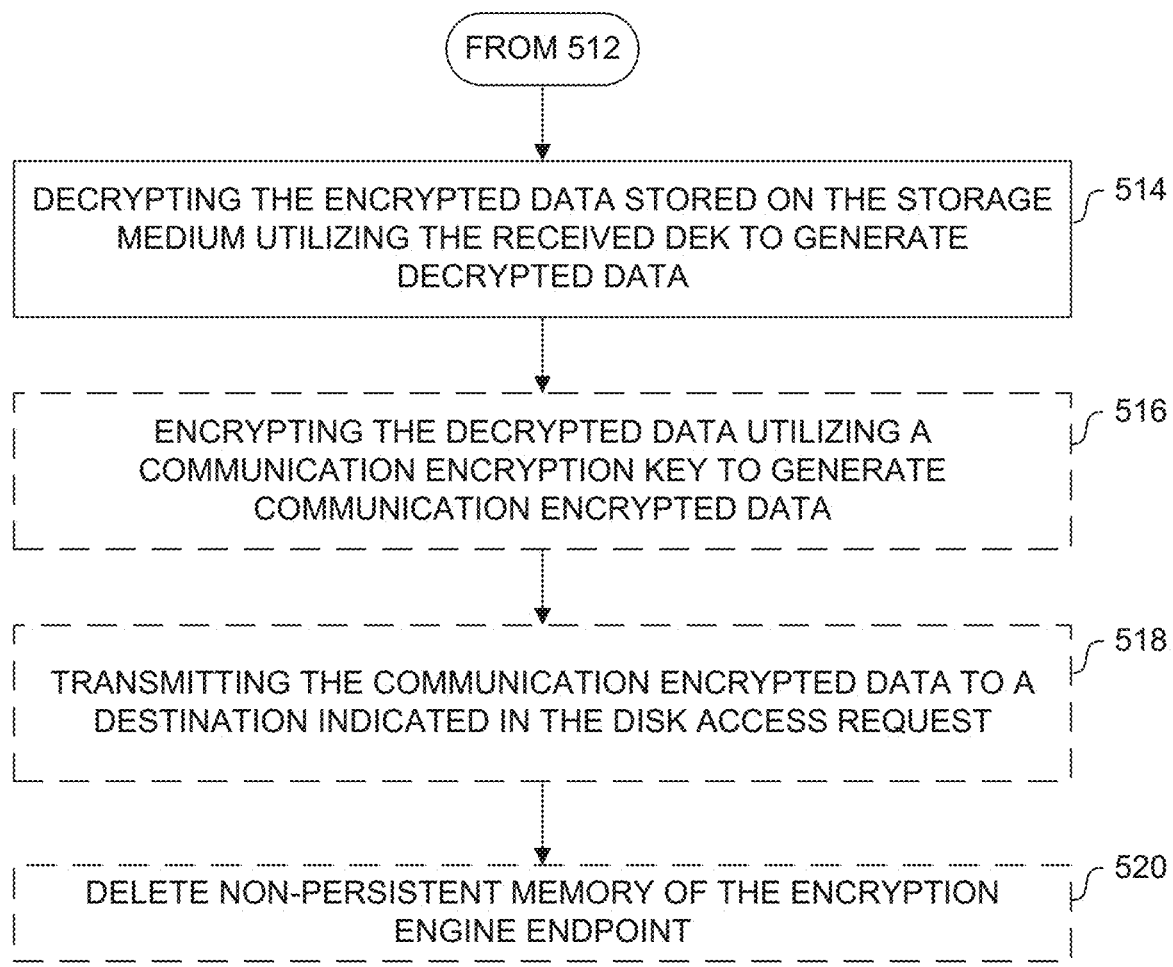

Referring now to FIGS. 5A and 5B, a flow chart illustrating a method for accessing data stored in a storage medium according to the method illustrated in FIG. 4 is shown. The method may be implemented in an encryption engine endpoint, such as the example encryption engine endpoint 110 described above with reference to FIG. 1. The method may be performed by, for example, one or more processors or controllers of an encryption engine endpoint that performs instructions stored in a memory of the encryption engine endpoint.

At 502, a data access request is received at the encryption engine endpoint from a client requesting access to the encrypted contents of the storage medium that is encrypted based on the method set forth in FIG. 4. The data access request includes a password and an encrypted security key encrypted using the public key of the encryption engine endpoint.

In an example, the data access request may be received at the encryption engine endpoint at 502 after the client has requested to the host CPU to communicate with the encryption engine endpoint. The request to the host CPU may also include authorization of the client in some way such as by, for example, providing login details, such as a username and password, for a user account within the data storage system. After the client has been authorized by the host CPU, the client and the encryption engine endpoint may communication directly using, for example, P2P communication such that the communication bypasses the host CPU.

At 504, the encryption engine endpoint decrypts the received encrypted security key utilizing the private key of the encryption engine endpoint to obtain the decrypted version of the security key, referred to herein as the received security key. The received security key includes a received DEK, a received authentication marker, and a received administrator password. In an example, the encryption engine endpoint stores the received DEK, the received authentication marker, and the received administrator password only in the non-persistent memory of the encryption engine endpoint in order to maintain security of the plain text versions of this data. For example, the received DEK, the received authentication marker, and the received administrator password may be stored only in an on-chip memory, similar to the on-chip memory 219 of the encryption engine endpoint 110 described with reference to FIG. 2.

At 506, the password received at 502 is compared to the received administrator password that is obtained at 504. If the passwords do not match, i.e., "NO" at 506, then the process ends because the correct password for accessing the encrypted contents of the storage medium has not been provided. This protects against an unauthorized party who has accessed the encrypted security key from utilizing that encrypted security key to access the encrypted storage medium. Access to the secured storage medium requires the encrypted security key and the correct administrator password.

If the passwords match, i.e., "YES" at 506, then the encryption engine endpoint method proceeds to 508 and the encrypted authentication marker stored on the storage medium is obtained. The encrypted authentication maker is obtained from the storage medium based on the storage location data that is included in the received authentication marker that is obtained at 504.

At 510 the encrypted authentication marker is decrypted by the encryption engine endpoint utilizing the private key of the encryption engine endpoint to obtain the authentication marker.

At 512, the encryption engine endpoint compares the authentication marker, obtained at 510 from the encrypted authentication marker stored on the storage medium, with the received authentication marker obtained at 504. If the authentication marker does not match the received authentication marker obtained at 504, i.e., "NO" at 512, then the process ends. In this case either the authentication marker included in the encrypted security key received at 502 is incorrect, possibly due to the security key being a fake provided by an unauthorized party, because the storage medium from which the authentication marker was obtained from at 508 has been altered or physically replaced with another storage medium, or because an encryption engine endpoint with the incorrect private key is used to access the data. Thus, comparing the received authentication marker obtained at 504 with the authentication marker obtained at 510 provides a further authentication of the client from which the data access request came from, the storage medium that is being accessed, and the encryption engine endpoint utilized to access the data.

If the received authentication marker obtained at 504 matches the authentication marker obtained at 510, i.e., "YES" at 512, then the process moves to 514 and data stored on the at least portion of the storage medium is decrypted utilizing the DEK to generate decrypted data.

In an example, the encryption engine endpoint stores the decrypted data only in a non-persistent memory of the encryption engine endpoint in order to increase security of the decrypted data. For example, the decrypted data may be stored only in an on-chip memory of the encryption engine endpoint, similar to the on-chip memory 219 of the example encryption engine endpoint described with reference to FIG. 2. Further, at 516, the encryption engine endpoint optionally encrypts the decrypted data utilizing a communication encryption key to generate communication encryption data. The communication encryption key may be, for example, a symmetric encryption key that is provided to the encryption engine endpoint by the client. For example, the data access request received at 502 may include the communication encryption key. In another example, the communication encryption key utilized at 516 may be a public key of a device to which the communication encrypted data is to be sent, such as, for example, the client from the data access request is received at 502, or a destination device that may be specified in the data access request.

Optionally, at 518, the encryption engine endpoint transmits the communication encrypted data to a destination. For example, the data access request received at 502 may indicate a destination to which the data is to be sent. The destination may include the client, or some other device such as another computer or a storage medium. In the event that the optional encrypting at 516 is not performed, the transmission at 518 may include transmitting the decrypting data to a destination indicated in the data access request. The communication encrypted data may be transmitted at 518 using, for example, P2P communication, and may be transmitted over a network via a NIC, similar to the network 104 and NIC 108 of the example data storage system 100 described with reference to FIG. 1.

Optionally at 520, the non-persistent memory of the encryption engine endpoint is cleared. For example, an on-chip memory, similar to on-chip memory 219 described with reference to FIG. 2, or the off-chip memory, similar to off-chip memory 204 described with reference to FIG. 2, or both on-chip and off-chip memories, may be cleared at 520. As disclosed above, clearing the non-persistent memory of the encryption engine endpoint removes any sensitive information that may remain in the non-persistent memory, such as any of the received DEK, the received authentication marker, the received administrator password, and the decrypted data.

Writing new encrypted contents or modifying encrypted contents in a storage medium encrypted utilizing the method of FIG. 4 may be provided utilizing steps similar to steps of the method for accessing encrypting data as described with reference to FIGS. 5A and 5B. For example, an encryption engine endpoint may receive a request to store new data to the encrypted media. The request may include a password and an encrypted security key encrypted using the encryption engine endpoint's public key, similar to 502 described previously. The encryption engine endpoint then decrypts the security key similar to 504 described previously. The encryption engine endpoint then compares the password with the received password similar to 506. If the passwords match, the encryption engine endpoint obtains the encrypted authentication marker from the storage medium similar to 508 and decrypting the authentication marker similar to 510 described previously. If the authentication marker matches the received authentication marker then the identity of the client and the storage medium with respect to the encryption engine endpoint has been verified and the method proceeds to storing the new data in the encrypted storage medium. If a communication encryption key was provided with the request, then encryption engine endpoint decrypts the new data using the communication encryption key then encrypts the data with the received DEK obtained by decrypting the received security key to generate encrypted new data. The encryption engine endpoint stores the encrypted new data in the storage medium. The new data may be stored at a location of the storage medium that is specified in the request. Once the encrypted new data is stored, the non-persistent memory of the encryption engine endpoint may optionally be erased for extra security similar to 520 described previously.

The methods set forth in FIGS. 4, 5A, and 5B provide a method of encrypting all or part of a storage medium such that accessing the encrypted data requires the valid encrypted security key, the valid password, the correct storage medium, and the encryption engine endpoint that performed the encryption on the disk. Increased security is provided over traditional methods of performing disk encryption because if any of these elements is not present, then the data cannot be accessed. For example, the security key can only be accessed by the encryption engine endpoint that encrypted the storage medium because the only stored copy of the security key is encrypted utilizing the public key of the encryption engine endpoint. This means that even if the encrypted security key and the administrator password are obtained by an unauthorized third party, and that third party obtained the storage medium, or a copy of the contents of the storage medium, they still could not access the data unless they also had access to the particular encryption engine endpoint that performed the encryption.

Further, the method of encrypting all or part of a storage medium illustrated in FIG. 4 enables an administrator changing the administrator password without having to decrypt then re-encrypt the encrypted contents of the storage medium.

Figure 6:
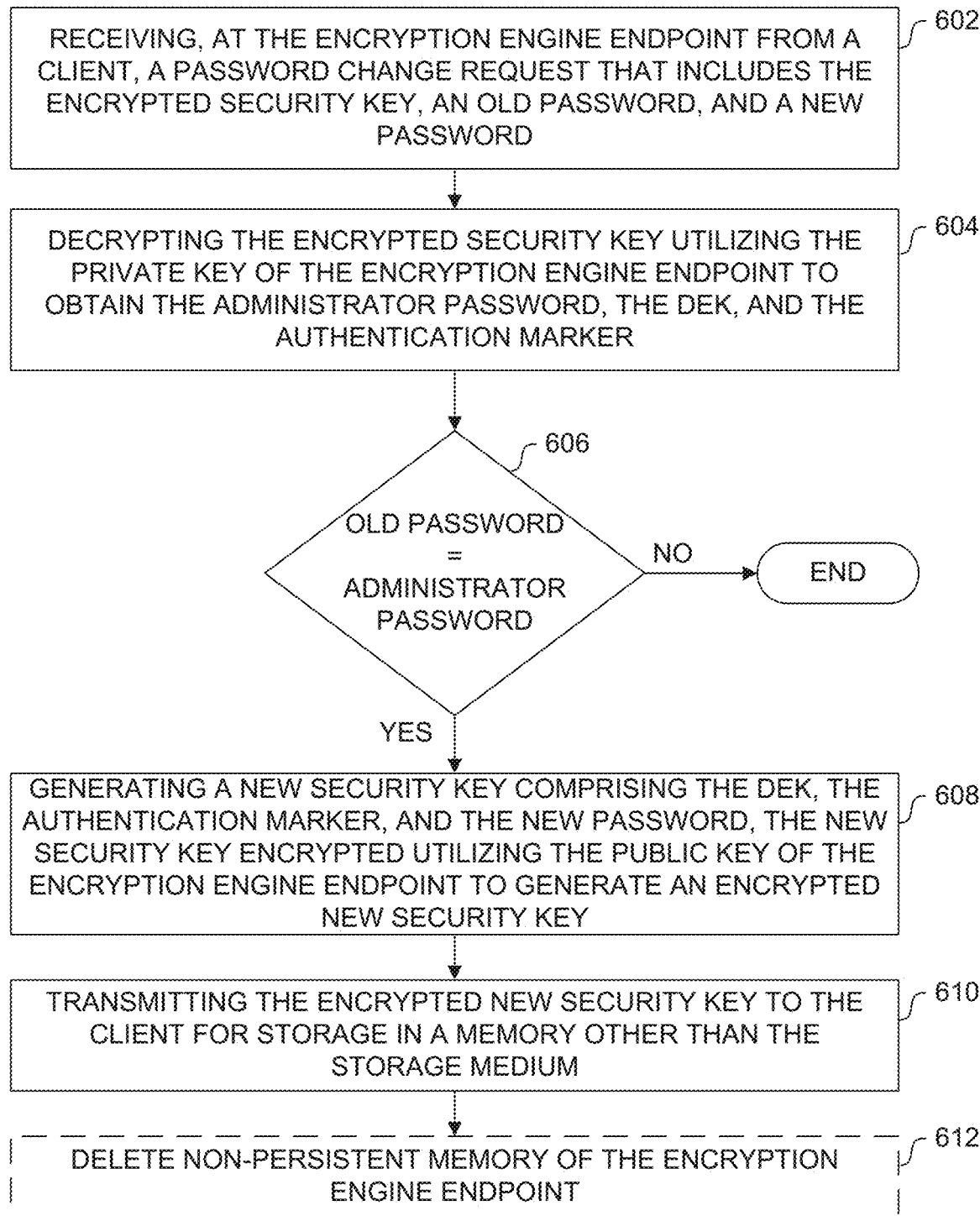
FIG. 6 is a flow chart of an example method for changing an administrator password for a storage device that has been encrypted according to the embodiment of FIG. 4.

Referring now to FIG. 6, a flow chart illustrating a method for changing an administrative password for the contents of a storage medium that are encrypted according to the method illustrated in FIG. 4 is shown. The method may be implemented in an encryption engine endpoint, such as the example encryption engine endpoint 110 described above with reference to FIG. 1. The method may be performed by, for example, one or more processors or controllers of an encryption engine endpoint that performs instructions stored in a memory of the encryption engine endpoint.

At 602, a password change request is received at the encryption engine endpoint from a client. The password change request includes the encrypted security key, an old password, and a new password.

In an example, the password change request may be received at the encryption engine endpoint at 602 after the client has requested to the host CPU to communicate with the encryption engine endpoint. The request to the host CPU may also include authorization of the client in some way such as by, for example, providing login details, such as a username and password, for a user account within the data storage system. After the client has been authorized by the host CPU, the client and the encryption engine endpoint may communication directly using, for example, P2P communication such that the communication bypasses the host CPU.

At 604, the encryption engine endpoint decrypts the encrypted security key received at 602 to obtain the administrator password, the DEK, and the authentication marker. In an example, for increased security the encryption engine endpoint stores the administrator password, the DEK, and the authentication marker obtained at 604 in the non-persistent memory of the encryption engine endpoint only. For example, the DEK, and the authentication marker obtained at 604 may be stored only in an on-chip memory similar to on-chip memory 219 of the example encryption engine endpoint described with reference to FIG. 2.

At 606, the encryption engine endpoint compares the old password received at 602 with the administrator password received at 604. If the old password is determined not to match the administrator password, i.e., "NO" at 606, then the process ends. In this case, the encryption engine endpoint may determine that the person attempting to change the password is not authorized to change the password.

If the old password is determined to match the administrative password, then the process proceeds to 608 and the encryption engine endpoint generates a new security key that comprises the DEK and the authentication marker obtained at 604 and the new password obtained at 602. The encryption engine endpoint encrypts the new security password utilizing the public key of the encryption engine endpoint to generate an encrypted new security key.

At 610, the encryption engine endpoint transmits the encrypted new security key to the client from which the password change request was received such that the client may store the encrypted new security key.

Optionally, at 612 the non-persistent memory of the encryption engine endpoint is cleared. For example, an on-chip memory, similar to on-chip memory 219 described with reference to FIG. 2, or the off-chip memory, similar to off-chip memory 204 described with reference to FIG. 2, or both on-chip and off-chip memories, may be cleared at 612. As disclosed above, clearing the non-persistent memory of the encryption engine endpoint removes any sensitive information that may remain in the non-persistent memory, such as any of the DEK, the authentication marker, the administrator password obtained from the security key at 604, the new password and old passwords received at 602, and the new security key generated at 608.

The method of encrypting all or part of a storage medium illustrated in FIG. 4 also enables an administrator changing the authentication marker, such as the random data included in the authentication marker, the location in the storage medium at which the authentication marker is stored, or both the random data and storage location, without having to decrypt then re-encrypt the encrypted contents of the storage medium.

Figure 7A:
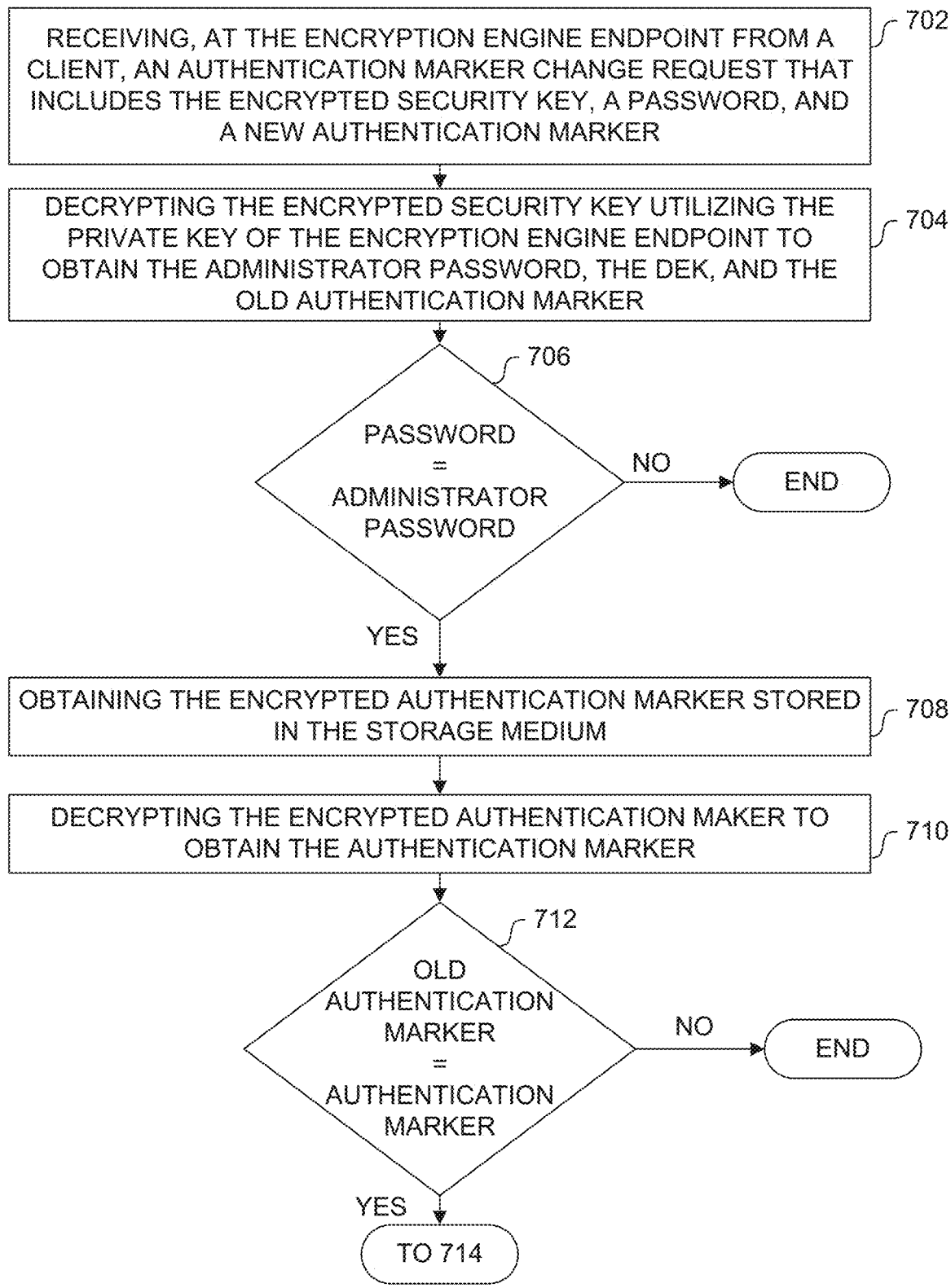
FIGS. 7A and 7B are a flow chart of an example method for changing an authentication marker for a storage device that has been encrypted according to the embodiment of FIG. 4.
Figure 7B:
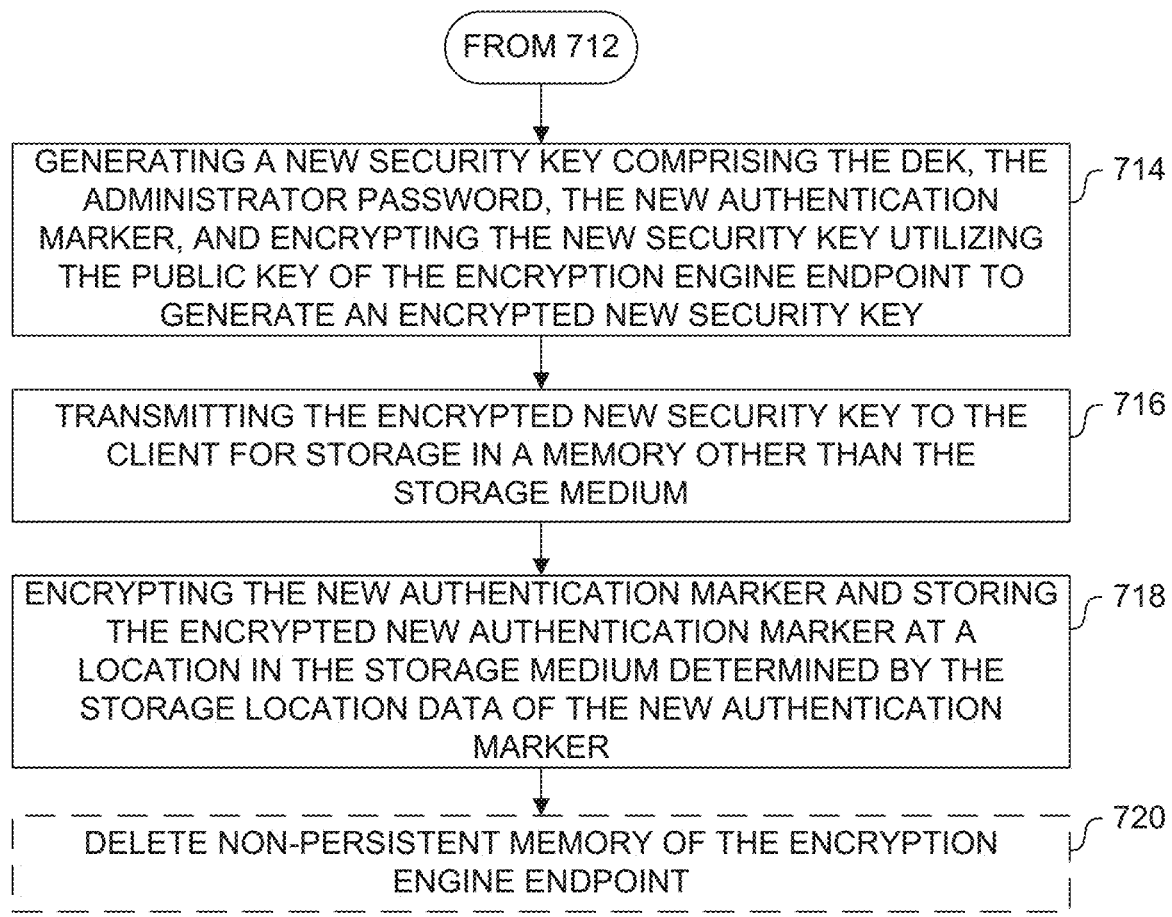

Referring now to FIGS. 7A and 7B, a flow chart illustrating a method for changing an authentication marker for a storage medium that has been encrypted according to the method illustrated in FIG. 4 is shown. The method may be implemented in an encryption engine endpoint, such as the example encryption engine endpoint 110 described above with reference to FIG. 1. The method may be performed by, for example, one or more processors or controllers of an encryption engine endpoint that performs instructions stored in a memory of the encryption engine endpoint.

At 702, an authentication marker change request is received at the encryption engine endpoint from a client. The authentication marker change request includes the encrypted security key, a password, and a new authentication marker. The new authentication marker may include random data, a checksum associated with the random data, and storage location data. Either the random data, and corresponding checksum, or the storage location data, or both of the random data, and corresponding checksum, and the storage location data may differ from the random data and the storage location data of the old authentication marker that is being replaced.

In an example, the authentication marker change request may be received at the encryption engine endpoint at 702 after the client has requested to the host CPU to communicate with the encryption engine endpoint. The request to the host CPU may also include authorization of the client in some way such as by, for example, providing login details, such as a username and password, for a user account within the data storage system. After the client has been authorized by the host CPU, the client and the encryption engine endpoint may communication directly using, for example, P2P communication such that the communication bypasses the host CPU.

At 704, the encryption engine endpoint decrypts the encrypted security key received at 702 to obtain the administrator password, the DEK, and the old authentication marker. In an example, for increased security the encryption engine endpoint stores the administrator password, the DEK, and the old authentication marker obtained at 704 and the password received at 702 in the non-persistent memory of the encryption engine endpoint only. This data may be stored only in an on-chip memory similar to on-chip memory 219 of the example encryption engine endpoint described with reference to FIG. 2.

At 706, the encryption engine endpoint compares the password received at 702 with the administrator password obtained at 704. If the password is determined not to match the administrator password, i.e., "NO" at 706, then the process ends. In this case, the encryption engine endpoint may determine that the person attempting to change the authentication marker is not authorized to change the authentication marker.

If the passwords match, i.e., "YES" at 706, then the encryption engine endpoint method proceeds to 708 and the encrypted authentication marker stored on the storage medium is obtained. The encrypted authentication maker is obtained from the storage medium based on the storage location data that is included in the old authentication marker that is obtained at 704.

At 710 the encrypted authentication marker is decrypted by the encryption engine endpoint utilizing the private key of the encryption engine endpoint to obtain the authentication marker.

At 712, the encryption engine endpoint compares the authentication marker, obtained at 710 from the encrypted authentication marker stored on the storage medium, with the old authentication marker obtained at 704. If the authentication marker does not match the old authentication marker obtained at 704, i.e., "NO" at 712, then the process ends. In this case either the authentication marker included in the encrypted security key received at 702 is incorrect, possibly due to the security key being a fake provided by an unauthorized party, because the storage medium from which the authentication marker was obtained at 708 has been altered or physically replaced with another storage medium, or because an encryption engine endpoint with the incorrect private key is used to access the data. Thus, comparing the old authentication marker obtained at 704 with the authentication marker obtained at 710 provides a further authentication of the client from which the data access request came from, the storage medium that is being accessed, and the encryption engine endpoint utilized to access the data.

If the old authentication marker obtained at 704 matches the authentication marker obtained at 710, i.e., "YES" at 712, then the process moves to 714 and the encryption engine endpoint generates a new security key that comprises the DEK and the password obtained at 704 and the new authentication marker received at 702. The encryption engine endpoint encrypts the new security password utilizing the public key of the encryption engine endpoint to generate an encrypted new security key.

At 716, the encryption engine endpoint transmits the encrypted new security key to the client from which the authentication marker change request was received such that the client may store the encrypted new security key.

At 718, the new authentication marker is encrypted utilizing the public key of the encryption engine endpoint to generate an encrypted new authentication marker, and the new authentication marker is stored on the storage medium at a location that corresponds to the storage location data included in the new authentication marker. Storing the new authentication marker may also include deleting the old authentication marker from the storage medium.

Optionally, at 720 the non-persistent memory of the encryption engine endpoint is cleared. For example, an on-chip memory, similar to on-chip memory 219 described with reference to FIG. 2, or the off-chip memory, similar to off-chip memory 204 described with reference to FIG. 2, or both on-chip and off-chip memories, may be cleared at 720. As disclosed above, clearing the non-persistent memory of the encryption engine endpoint removes any sensitive information that may remain in the non-persistent memory, such as any of the DEK, the authentication marker, the administrator password obtained from the security key at 704, the password and new authentication marker received at 702, and the new security key generated at 714.

Embodiments of the present disclosure provide for data encryption by an encryption endpoint engine to free processing resources of a host CPU of a data storage system. Further, in the disclosed embodiments, security keys and encryption keys are maintained by the clients, separate from the storage medium on which encrypted data is stored, which eliminates the need for the host CPU to retain unencrypted, i.e., plain text, versions of security keys, which increases the overall security of the data stored in the data storage system. Therefore, in the disclosed embodiments, only the client has access to the security and encryption keys, and therefore is the only person who can authorize access to the encrypted data, providing transparency to the user.

Further, in disclosed embodiments all unencrypted versions of sensitive data within the data storage system, including security keys, encryption keys, and storage data, are stored only in the non-persistent memory such as, for example, an on-chip memory of the encryption engine endpoint. Storing sensitive data in non-persistent memory only may inhibit the opportunity for unauthorized access of the security and encryption keys through breaches of the data storage system by unauthorized parties. Further, utilizing on-chip memory for storing unencrypted versions of such sensitive data may inhibit obtaining the data by tapping on board wires of the encryption engine endpoint.

Further, by utilizing direct P2P communication between a client and an encryption engine endpoint, user data, either encrypted or plain text, may be transferred directly between the client and the encryption engine endpoint, or to another destination endpoint, without passing through the host memory, which further inhibits unauthorized access to the user data.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for encrypting data in a data storage system that includes a host CPU, an encryption engine endpoint, and a storage medium, the method comprising:
   receiving, at the encryption engine endpoint from a client, a secure message that includes a storage encryption key, wherein data included in the secure message is previously unknown to the encryption endpoint engine and the host CPU and wherein the secure message is encrypted utilizing a public key of the encryption engine endpoint prior to being received;
   decrypting, by the encryption engine endpoint, the secure message utilizing a private key of the encryption engine endpoint to obtain the storage encryption key, wherein the decrypted storage encryption key is stored only in a non-persistent memory of the encryption engine endpoint;
   transmitting, by the encryption engine endpoint to the client, a secure response that is based on the secure message;
   receiving, at the encryption engine endpoint from the client, storage data to be encrypted using the storage encryption key;
   encrypting, by the encryption engine, the received storage data utilizing the storage encryption key to generate encrypted storage data; and
   storing the encrypted storage data in the storage medium.

2. The method of claim 1, wherein the secure message further includes random data not previously known to the encryption endpoint engine and the host CPU such that decrypting the secure message utilizing the private key obtains the random data, and the secure response transmitted to the client is based on the random data.

3. The method of claim 1, wherein the secure message further includes a communication encryption key, distinct from the storage encryption key, and wherein transmitting the secure response comprises encrypting the secure response with the communication encryption key prior to transmitting to the client.

4. The method of claim 3, wherein the secure response is a checksum of the storage encryption key.

5. The method of claim 3, wherein the received storage data is encrypted utilizing the communication encryption key, the method further comprising decrypting, by the encryption engine endpoint, the received storage data prior to encrypting the storage data utilizing the storage encryption key.

6. The method of claim 3, wherein the secure message further includes random data not previously known to the encryption endpoint engine and the host CPU such that decrypting the secure message utilizing the private key obtains the random data, and wherein transmitting the secure message comprises encrypting the random data utilizing the communication encryption key to generate encrypted random data and transmitting the encrypted random data to the client.

7. The method of claim 1, wherein communication between the encryption engine endpoint and the client is direct communication utilizing peer to peer communication.

8. The method of claim 1, wherein unencrypted versions of the storage encryption key and the storage data are stored only in an on-chip non-persistent memory of the encryption endpoint engine.

* * * * *